(12) United States Patent
Mancini

(10) Patent No.: US 6,625,926 B1
(45) Date of Patent: Sep. 30, 2003

(54) TREE AND SHRUB STABILIZING APPARATUS AND METHOD FOR STABILIZING A TREE OR SHRUB

(76) Inventor: James A. Mancini, 38 Upper Kingtown Rd., Pittstown, NJ (US) 08867

( * ) Notice: Subject to any disclaimer, the term of this patent is extended or adjusted under 35 U.S.C. 154(b) by 0 days.

(21) Appl. No.: 10/122,463

(22) Filed: Apr. 15, 2002

(51) Int. Cl.[7] ............................................. A01G 17/06
(52) U.S. Cl. .................. 47/42; 47/44; 47/32.5
(58) Field of Search ............................... 47/42, 43, 44, 47/45, 46, 47, 32, 32.5, 32.7, 32.8, 32.6, 41.14; 52/162; 248/538, 351

(56) References Cited

U.S. PATENT DOCUMENTS

| | | | |
|---|---|---|---|
| 1,377,832 A | | 5/1921 | Hanner |
| 2,102,748 A | * | 12/1937 | Rocquin |
| 4,894,950 A | | 1/1990 | Yukio et al. ................ 47/42 |
| 5,568,700 A | | 10/1996 | Veneziano et al. ............ 47/43 |
| 6,065,243 A | * | 5/2000 | Mancini et al. .............. 47/42 |
| 6,141,903 A | * | 11/2000 | Mancini ................... 47/42 |
| 6,256,942 B1 | * | 7/2001 | Schatz .................... 52/155 |
| 6,299,125 B1 | | 10/2001 | Zayeratabat ............... 248/530 |
| 6,460,289 B1 | * | 10/2002 | Kessler et al. .............. 47/42 |

FOREIGN PATENT DOCUMENTS

| | | | | |
|---|---|---|---|---|
| DE | 4008-580 A1 | | 3/1990 | |
| JP | 403112419 A | * | 5/1991 | .......... A01G/23/04 |
| JP | 404173027 A | * | 6/1992 | .......... A01G/23/04 |
| JP | 407023669 A | * | 1/1995 | .......... A01G/17/04 |
| JP | 407023670 A | * | 1/1995 | .......... A01G/23/02 |
| JP | 409131141 A | * | 5/1997 | .......... A01G/23/04 |
| JP | 409313054 A | * | 12/1997 | .......... A01G/23/04 |

OTHER PUBLICATIONS

Nine (9) pages providing tree staking information from website http://www.lee–county.com/publicworks/landpage50.htm.

1 Page product description for "Model 40 RBK Kit" by Foresight Products, L.L.C. of Commerce City Colorado, obtained from website http://www.earthanchor.com/duckdraw7.html on Jan. 25, 2002.

2 Page product description for "Model 68 RBK Kit" by Foresight Products, L.L.C. of Commerce City Colorado, obtained from website http://www.earthanchor.com/duckdraw4.html on Jan. 25, 2002.

1 Page illustration of a "tensioner cable system" by Foresight Products, L.L.C. of Commerce City Colorado, obtained from website http://www.earthanchor.com/duckdraw8.html on Jan. 25, 2002.

* cited by examiner

Primary Examiner—Charles T. Jordan
Assistant Examiner—Andrea M. Valenti
(74) Attorney, Agent, or Firm—Watov & Kipnes, P.C.; Kenneth Watov

(57) ABSTRACT

An apparatus for stabilizing a tree or shrub, comprises a plurality of stakes each including first and second ends, respectively, the first ends being adapted for permitting the stakes to be driven into the ground, a plurality of straps, and attachment hooks located on the plurality of stakes, respectively, for securely attaching a portion of selected ones of the plurality of straps thereto, respectively, wherein the plurality of stakes are arranged in a desired spaced apart configuration around the root ball, and driven via their respective first ends at least partly into the ground, each of the plurality of straps being individually connected via the attachment hooks to and between a selected pair of the plurality of stakes, respectively, for providing a desired configuration of a single layer or multiple overlying layers of the plurality of straps, whereby the plurality of straps are positioned over and against the root ball to provide a downward force thereagainst and to secure the root ball in place.

20 Claims, 2 Drawing Sheets

TREE AND SHRUB STABILIZING APPARATUS AND METHOD FOR STABILIZING A TREE OR SHRUB

RELATED PATENT APPLICATION AND PATENTS

This Application is related to U.S. Patent Application Ser. No. 10/113,729 : entitled UNITARY TREE AND SHRUB STABILIZING DEVICE, filed on Apr. 1, 2002; U.S. Pat. No. 6,141,903, entitled TREE STAPLE, issued on Nov. 7, 2000; and U.S. Pat. No. 6,065,243, entitled TREE AND SHRUB STABILIZING DEVICE, issued on May 23, 2000. Each of the related patent application and patents have common ownership herewith.

FIELD OF THE INVENTION

The present invention relates generally to an apparatus for stabilizing newly planted trees and shrubs to prevent them from shifting or toppling while their root systems are first developing,

BACKGROUND OF THE INVENTION

In the initial period, newly planted trees or shrubs typically require some level of assisted support to avert tilting or toppling. Strong winds and excessive moisture can cause a poorly supported tree or shrub to lean excessively or fall to the ground. Adequate support not only enhances the survival of the tree or shrub during the critical growth period, but also reduces the risks of injury to people and of damage to property. The support is usually maintained until the roots have sufficiently established themselves in the ground. The time required for the roots to establish themselves can vary depending on tree or shrub type, growth conditions, soil type and condition, moisture and nutrient level and other factors. Adequate support is necessary for larger trees or shrubs especially those planted during wet or freezing weather.

Conventional methods for supporting trees or shrubs typically include driving two or more stakes into the ground adjacent to the trunk or the tree or shrub and tethering guy lines between the trunk and the respective stakes to provide the support. The stakes are usually composed of wood or other suitable material in the form of short spikes a few inches in length to elongate poles a few feet long. The stakes and guy lines are typical adapted for single use. Such conventional methods are also generally suitable for stabilizing small to moderate sized trees and shrubs, and are not recommended for supporting substantially larger trees and shrubs.

There are several disadvantages associated with using stakes and guy line systems. The stakes and guy lines are typically exposed above grade level of the ground, and can pose hazards to passing traffic such as pedestrians, children, ground maintenance equipment such as lawnmowers and the like. The presence of such components are usually displeasing to the eye and often undesirably detract from the appearance of the tree or shrub and the surrounding area. The stakes and guy lines also need frequent attention and adjustment, since they can become loosened, vandalized, damaged, shifted or simply outgrown by the tree or shrub. Once the roots of the tree or shrub have established themselves, the stakes and guy lines require prompt disassembly and removal to avoid inflicting potentially fatal injuries to the tree or shrub as it grows.

For the foregoing reasons, there is a need for developing an improved device and method for providing a tree or shrub with adequate support at the time of planting that avoids the limitations and disadvantages typically associated with conventional devices and methods as highlighted above.

SUMMARY OF THE INVENTION

The present invention is directed to an apparatus and a method for stabilizing a tree or a shrub to prevent it from toppling from a vertical position. The apparatus generally includes two or more stakes inserted into the ground in a circumferentially spaced apart manner around the root ball of a tree or shrub, with one or more pieces or straps of flexible material secured to the stakes. As the stakes are driven.into the ground, the one or more straps are drawn downwardly to exert a constant pressure upon the root ball, thus immobilizing it and preventing movement that can result in toppling of the associated tree or shrub.

In one particular aspect of the present invention, there is provided an apparatus for stabilizing a tree or shrub, comprising:

a plurality of stakes each including first and second ends, respectively, the first ends being adapted for permitting the stakes to be driven into the ground; and at least one strap having portions thereof individually to and between selected pairs of the plurality of stakes, respectively, wherein the plurality of stakes are arranged in a desired spaced apart configuration around the root ball, and driven via their respective first ends at least partly into the ground, whereby the portions of the at least one strap are positioned over and against the root ball desired configuration to provide a downward force thereagainst and to secure the root ball in place.

In another particular aspect of the present invention, there is provided an apparatus for stabilizing a tree or shrub, comprising:

a plurality of stakes each including first and second ends, respectively, the first ends being adapted for permitting the stakes to be driven into the ground;

at least one strap; and attachment means located on the plurality of stakes, respectively, for securely attaching a portion of the at least one strap thereto, wherein the plurality of stakes are arranged in a desired spaced apart configuration around the root ball, and driven via their respective first ends at least partly into the ground, and the at least one strap has individual portions connected via the attachment means between selected ones of the plurality of stakes in a desired configuration for positioning the portions of the at least one strap over and against the root ball in a desired configuration to provide a downward force thereagainst and to secure the root ball in place.

In another particular aspect of the present invention, there is provided an apparatus for stabilizing a tree or shrub, comprising:

a plurality of stakes each including first and second ends, respectively, the first ends being adapted for permitting the stakes to be driven into the ground; and a plurality of straps each being individually attached to and between a selected pair of the plurality of stakes, respectively, wherein the plurality of stakes are arranged in a desired spaced apart configuration around the root ball, and driven via their respective first ends at least partly into the ground, whereby the plurality of straps are positioned over and against the root ball to provide a downward force thereagainst and to secure the root ball in place.

In another particular aspect of the present invention, there is provided a method for stabilizing a tree or shrub, comprising:

inserting a plurality of stakes into the ground in a spaced apart arrangement around the circumference of the root ball of the tree or shrub;

attaching either each one of a plurality of straps individually between selected pairs of the plurality of stakes, respectively, or a single elongated strap with portions thereof between the selected pairs of the plurality of stakes, across and against a top portion of the root ball; and tensioning the plurality of straps attached to and between the corresponding selected pairs of the plurality of stakes to provide a sufficient downward force against the root ball to secure the root ball in place.

BRIEF DESCRIPTION OF THE DRAWINGS

The various embodiments of the invention are described in detail below with reference to the drawings, in which like items are identified by the same reference designation, wherein.

DETAILED DESCRIPTION OF THE INVENTION

Figure 1:
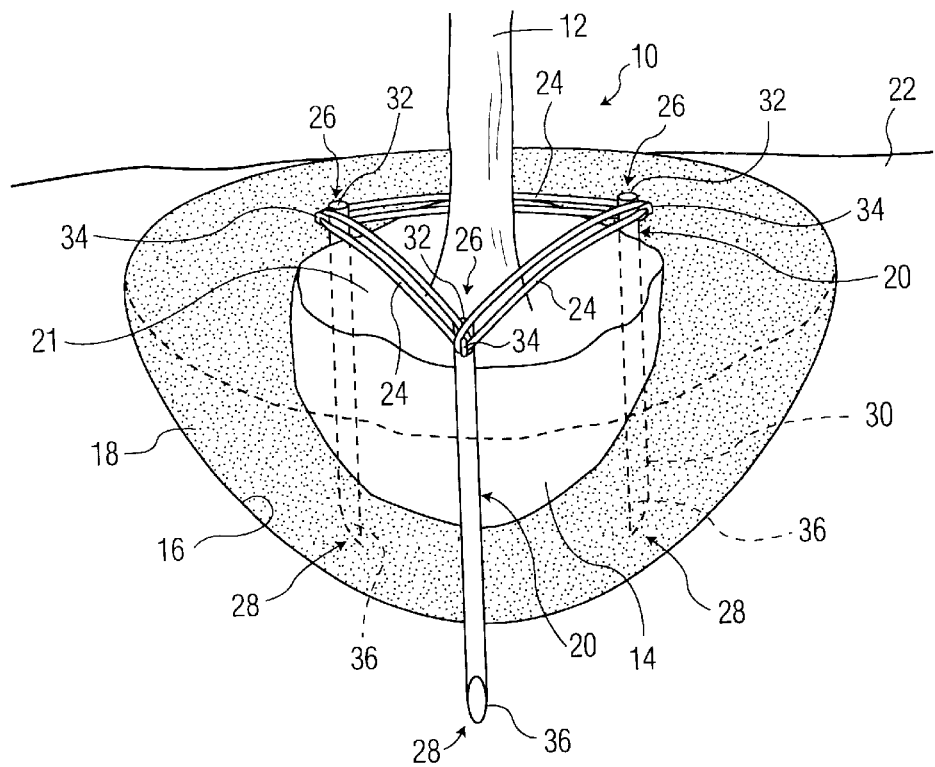
FIG. 1 is a partial cross sectional view of a planting hole in which the root ball of a tree is planted and stabilized therein by tree stabilizing apparatus for one embodiment of the present invention.

The present invention is generally directed to apparatus for stabilizing trees or shrubs and to prevent their toppling over or shifting from a vertically upright position. The apparatus can be installed in a rapid and simple manner, while being cost effective to fabricate. The apparatus is designed for effective concealment, thus providing a desirable neat appearance of the surrounding area and minimizing obstructions to passing traffic. The apparatus is further designed to avoid direct contact with an associated tree or shrub that may cause damage or injury to the trunk or root system thereof With reference to FIG. 1, a tree stabilizing apparatus 10 is illustrated for one embodiment of the present invention. The apparatus 10 is adapted to provide safe and effective support to a tree 12 having a root ball 14 surrounded by fill soil 18 in a planting hole 16. The planting hole 16 is typically prepared by digging a hole having a diameter twice that of the root ball 14. The apparatus 10 includes two or more stakes 20 arranged in a spaced apart manner around and adjacent to the circumference of the root ball 14. In this example, three stakes 20 are shown positioned equidistant from one another. It is noted that the number and arrangement of the stakes can vary depending on the size of the tree and root ball, the soil conditions, soil type and the like.

The stakes 20 are each configured to be driven vertically through the fill soil 18 into surrounding undisturbed soil 22 beneath the planting hole 16 to provide firm anchoring. Preferably, the stakes 20 are positioned adjacent to the root ball 14 of the tree 12. The stakes 20 are adapted to be driven into the ground through suitable means including hammering and the like. It is noted that the lengths of the stakes 20 can be modified as necessary depending on the needs of the application at hand, the depth of the planting hole, soil conditions, terrain features, and the like.

The apparatus 10 further includes a plurality of flexible straps 24, each having one end securely attached to an upper portion 26 of one stake 20 and the other end securely attached to the upper portion 26 of a successive stake 20. Each of the flexible straps 24 is secured to and between successive stakes 20, respectively and, in combination, forming a support band extending over the root ball 14 around the tree 12, as shown. As the stakes 20 are driven deeper into the ground, the support band comprising the co-joined successive flexible straps 24 is drawn downward against the top portion 21 of the root ball 14. In the installed state, the stakes 20 are adapted to securely retain the corresponding flexible straps 24 where a continuous downward pressure is applied over the top portion 21 of the root ball 14 to safely and effectively immobilize the root ball 14 in place. In this manner, the apparatus 10 can effectively minimize undesirable movement that may cause the tree 12 to shift or topple to the ground.

The flexible straps 24 are each further adapted to conform to the shape and contours of the root ball 14 and to uniformly distribute the downward pressure on the top portion 21 of the root ball 14. In this manner, the shear and strain generated by the tree 12 are effectively dispersed over a significant area of the root ball 14, thus preventing or at least substantially minimizing injury or damage to the tree roots as the tree 12 is retained in a desired orientation. The straps 24 can be fabricated from any flexible material including, but not limited to, elastomeric materials, woven and non-woven materials, biodegradable materials, plastic materials, fibrous materials and the like. Preferably, the straps 24 are formed from a biodegradable, environmentally-acceptable and safe material such as burlap, linen, and the like that can slowly decompose over time and eventually mix with the surrounding soil. Accordingly, the apparatus 10 can be permanently installed in the ground with little or no adverse effect on the tree's root system. It is further noted that the dimension, thickness and shape of the flexible straps 24 can also vary as required depending on the means of attachment to the stakes, the number of stakes used, the configuration of the stakes, root ball dimensions and the like.

In an alternative embodiment, the plurality of straps 24 can be supplanted by a single unitary piece or segment of flexible material extending around the tree or shrub 12 and secured to the upper portions 25 of the successive stakes 20 to form a closed polygonal-like band therearound over the root ball 14. The stakes 20 can then be driven into the ground until the unitary piece or segment of flexible material is pulled downward onto the root ball 14 for secure retainment. Also, for this embodiment, and other of the embodiments, any excess length of a strap 24 can be taken up by wrapping the strap 24 a number of times around a top portion of an associated stake 20.

Figure 2:
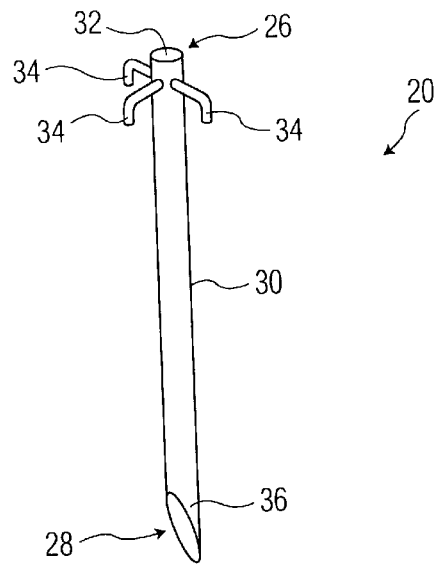
FIG. 2 is a pictorial view a stake of the tree stabilizing apparatus for one embodiment of the present invention.

Referring to FIGS. 1 and 2, each of the stakes 20 includes an upper portion 26, a lower portion 28 and a shaft portion 30 extending therebetween. The stake 20 can be fabricated with a solid or tubular construction using a durable, rigid material that is impact resistant including metal such as ferrous-based materials, plastic polymers, wood materials, fibrous material or other suitable material that is at least minimally safe for plants including trees and shrubs, and free from harmful plating or coatings, for example.

In another embodiment of the present invention, the stake 20 can be fabricated from a plastic polymer material preferably biodegradable plastic polymer. The plastic polymer can be extruded, molded or reinforced, and is capable of withstanding the rigors associated with installation and use. The plastic polymer material can be further impregnated with a soil enriching or conditioning agent that can be released over time into the surrounding soil and provide beneficial sustenance for the growth of plants, including trees and shrubs. Such soil enriching agent can include minerals, ion forming compounds, fertilizers including fixed nitrogen sources, and other suitable plant nutrients.

The upper portion 26 of the stake 20 further includes a striking end 32 configured to receive and direct the impact of a hammer or mallet along the length thereof, and one or more hook members 34 (see FIG. 2) adapted for facilitating attachment of one or more strap 24 thereto. The hook member(s) 34 can be formed on the stake 20 through suitable means including welding, casting and the like. The hook member(s) 34 are not limited to the form depicted in the drawings, and can include other forms or structures capable of facilitating secure attachment of the strap 24 to the stake 20 as known by one of ordinary skill in the art.

As shown in FIG. 1, at least where only one hook member 34 is provided the hook members 34 in the apparatus 10 are generally oriented radially away from the center of the tree 12, thereby ensuring the retainment of the straps 24 thereon. In the present embodiment, the straps 24 can be fabricated from a woven material such as burlap and the like, in the form of substantially elliptical bands, or loops, in this example. Each strap 24 is secured between successive stakes 20 by looping or fastening the ends thereof onto the corresponding hook members 34. Alternatively, the straps 24 can be in the form of strips fabricated with a reinforced eyelet at each opposed ends thereof to facilitate secure fastening engagement with the corresponding hook members 34 between the corresponding stakes 20, respectively.

The lower portion 28 of the stake 20 includes a ground penetrating tip 36. In one embodiment, the tip 36 can be formed by cutting the lower portion 28 at an angle suitable for forming a sharp point. For tubular constructions, the tip 36 can be modified to be sealed from the exterior through suitable means include pinching, heat welding or the like. Alternatively, the tip 36 can be formed by shearing the lower end 28 of the stake 20. For tubular constructions, the tip 36 is effectively sealed during formation. The method of forming the tip 36 is not limited to that disclosed above and can include other methods of forming a sharp ground penetrating tip as known in the art.

The installation of the apparatus 10 will now be described in connection with FIGS. 1 and 2. The root ball 14 is placed into the planting hole 16. The planting hole 16 is filled with a fill soil 18 to elevate the base of the tree 12 or the top portion of its root ball 14 above or even with the finished grade. With the root ball 14 and the fill soil 18 installed in the planting hole 16, the stakes 20 are arranged in a spaced apart manner around the tree 12 along or adjacent to the periphery of the root ball 14. In other words, the stakes 20 located proximate the root ball 14 about the circumference thereof The number and spatial distribution of the stakes 20 around the circumference of the root ball 14 can be modified as required to meet the support needs of the tree 12.

The stakes 20 are preferably adapted to extend through the fill dirt 18 into the surrounding undisturbed soil 22 for deep anchoring engagement. The stakes 20 are driven to a partial depth into the ground by striking each stake 20 at the striking end 32 using conventionally available mallets, sledge hammers or other appropriate means, Thereafter, the ends of each flexible strap 24 are secured to the respective hook members 34 of the adjacent stakes 20. With the tree 12 retained in a desired position, the stakes 20 are driven deeper into the ground to pull downward and to more firmly or tightly draw the flexible straps 24 onto the top portion 21 of the root ball 14. Alternatively, prior to permanent securement of the straps 24 to the stakes 20, a tensioning device or a winch can be used to adjust the tension in the straps 24 as required to attain firm retainment of the root ball 14. Note that when so installed, the tips 36 of the stakes 20 are firmly lodged into the surrounding undisturbed soil 22 beneath the planting hole 16. Once the apparatus 10 is installed, the top portion 21 of the root ball 10 can be covered with a layer of fill soil 18 and/or a layer of mulch or other suitable planting material. Optionally, the striking ends 32 can be driven down to below ground level for concealed installation of the apparatus 10.

Figure 3:
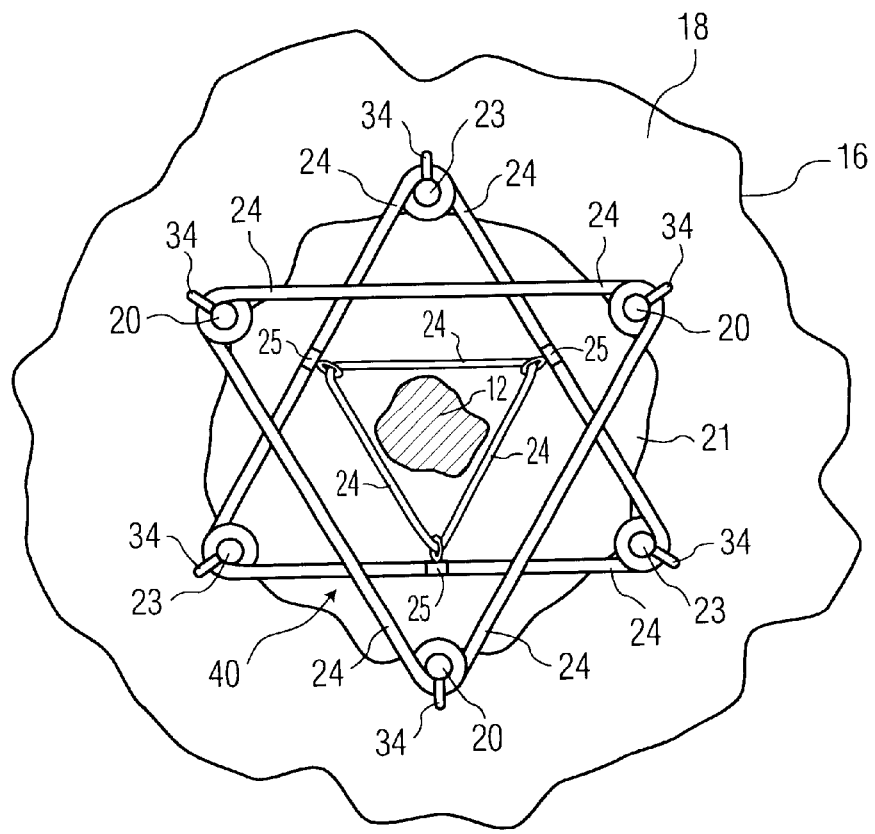
FIG. 3 is a top view of tree stabilizing apparatus installed around a tree for another embodiment of the present invention.

With reference to FIG. 3, tree stabilizing apparatus 40 is shown for an alterative embodiment of the present invention. The apparatus 40 includes six stakes 20 and 23, respectively, installed in the ground around the circumference of the root ball 14 in a spaced apart arrangement, and six straps 24 secured to and between corresponding pairs of stakes 20 or 23. The stakes 20 and 23, respectively, are each driven into the fill soil 18 and extend into undisturbed soil beneath the planting hole 16 as described above. Each of the straps 24 are secured to and between corresponding stakes 20 or 23, respectively, by a hook member 34 projecting from the stakes 20 and 23, respectively. In this arrangement, the apparatus 40 includes two overlapping layers of straps 24 pressed tightly downward against a top portion 21 of the root ball 14.

The number of stakes and patterns of straps are not limited to the embodiment shown herein, and can include further configurations having a single layer or multiple overlapping layers of straps as required to adapt to the needs of the tree stabilizing application, for enhancing stabilization. Furthermore, the straps can be arranged in different configurations and patterns depending on the corresponding pairs of stakes selected for securement of the straps in accordance with the present invention. For example, as shown in FIG. 3, eyelets 25 or other suitable fastening means can be added at intermediary points of the straps 24 to permit additional straps 24 to be installed between the respective eyelets 25 to provide additional support for small or weak root balls.

Figure 4:
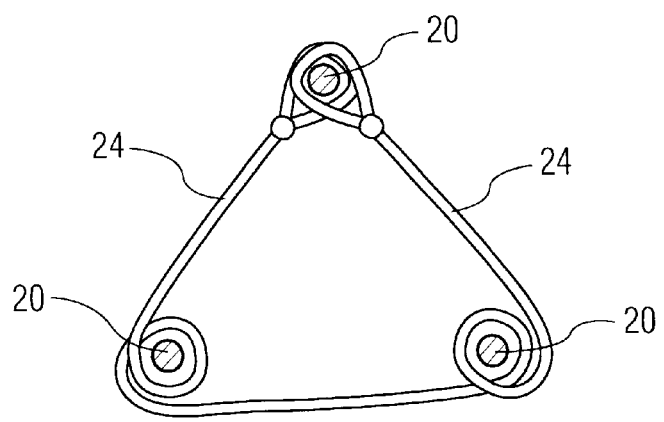
FIG. 4 is a schematic illustration of a suitable layout for securing a strap to a plurality of stakes in accordance with the present invention.

With reference to FIG. 4, a schematic layout is shown to illustrate an alternate arrangement for securing a single unitary strap 24 to a plurality of stakes 20. With the stakes 20 suitably installed in the manner described above, the single unitary strap 24 can be readily fastened to the plurality of stakes 20 to secure the tree or shrub root ball. One end of the strap 24 is fastened to a first stake 20, in this example, by slipping a looped end portion over the corresponding first stake 20. The strap 24 is then drawn to the stake 20 adjacent to the first stake 20, and wrapped therearound at least once. The same process is repeated for the next successive stake 20. The other end of the strap 24 is looped and fastened to the first stake 20, as shown, to complete the circumferential loop around the tree or shrub. Preferably, the strap 24 is fastened in a taut condition wherein sufficient tension is generated, typically by driving the stakes 20 further into the ground, to effectively retain the tree or shrub root ball thereunder. Optionally, any excess length of the strap 24 can also be wrapped around the stakes 20 as needed to achieve a taut condition.

Although various embodiments of the invention have been shown and described, they are not meant to be limiting. Those of skill in the art may recognize various modifications to these embodiments, which modifications are meant to be covered by the spirit and scope of the appended claims. For example, if the integrity of the root ball of a tree is disrupted by drying, poor preparation or rough handling, causing the dirt to break away from the root ball, guy lines may be optionally secured to the hooks 34 of the stakes 20 and the trunk of the tree 12.

What is claimed is:

1. A method for stabilizing a tree or shrub, comprising the steps of:

forming first through third stakes each including a first and second end, attachment means located proximate the first end for securing a portion of a strap thereto, and said second end being configured for permitting the associated stake to be driven into the ground;

positioning said first, second, and third stakes in a first triangular configuration around and proximate the outside circumference of a root ball of a tree or shrub within a hole;

driving each of said first through third stakes into the ground with each respective attachment means located immediately above ground level; and connecting a first strap directly between each pair of said first and second, second and third, and third and first stakes via securement to each associated attachment means, respectively, thereby forming a triangular configuration having its three sides formed from first strap portions, respectively, with sufficient tension on each first strap portion to provide a downward force against the root ball to secure it in place.

2. The method of claim 1, further including the step of:

driving said first through third stakes further into the ground for increasing the tensioning of said first strap portions.

3. The method of claim 1, wherein said first strap is composed of flexible material.

4. The method of claim 3, further including the step of selecting said flexible material from the group consisting of elastomeric materials, woven materials, non-woven materials, biodegradable materials, plastic.materials and fibrous materials.

5. The method of claim 3, further including the step of selecting the flexible material from the group consisting of burlaps, linens and plastics.

6. The method of claim 1, further including in said forming step, constructing said first through third stakes from tubular or solid material.

7. The method of claim 1, wherein the attachment means further comprises at least one hook member.

8. The method of claim 7, further including the step of directing the at least one hook member of said first through third stakes radially away from the center of the associated tree or shrub.

9. The method of claim 1, wherein the first through third stakes are each composed of a material selected from the group consisting of metals, plastics and wood materials.

10. The method of claim 1, further including the steps of:

forming fourth through sixth stakes each including a first and second end, attachment means located proximate the first end for securing a portion of a strap thereto, and said second end being configured for permitting the associated stake to be driven into the ground;

driving said fourth, fifth, and sixth stakes into the ground in said hole between said first and second, second and third, and third and first ones of said stakes, respectively, forming a second triangular configuration proximate the outside circumference of the associated root ball; and connecting a second strap overlying said first strap, said second strap having portions directly connected between said fourth and fifth, fifth and sixth, and sixth and fourth stakes via securement to each associated attachment means, respectively, thereby forming a triangular configuration having its three sides formed from second strap portions, respectively, with sufficient tension on each second strap portion to provide a downward force against the root ball to further secure it in place, the combination of said first and second strap portions forming a Star of David configuration.

11. The method of claims 10, further including the step of:

driving said first through sixth stakes further into the ground for increasing the tensioning of said first and second strap portions.

12. The method of claim 10, further including the steps of:

securing first, second, and third rings or eyelets on portions of said second strap between said fourth and fifth, fifth and sixth, and sixth and fourth stakes, respectively;

connecting a third strap under tension between said first and second, second and third, and third and first rings or eyelets, for further securing said root ball.

13. The method of claim 12, further including the step of:

driving said first through sixth stakes further into the ground for increasing the tension of said first, second, and third straps.

14. The method of claim 12, wherein said first through third straps are each composed of flexible material.

15. The method of claim 14, further including the step of selecting said flexible material from the group consisting of elastomeric materials, woven materials, non-woven materials, biodegradable materials, plastic materials and fibrous materials.

16. The method of claim 14, further including the step of selecting the flexible material from the group consisting of burlaps, linens and plastics.

17. The method of claim 10, further including in said forming step, constructing said first through sixth stakes from tubular or solid material.

18. The method of claim 10, wherein the attachment means further comprises at least one hook member.

19. The method of claim 18, further including the step of directing the at least one hook member of said first through sixth stakes radially away from the center of the associated tree or shrub.

20. The method of claim 10, wherein the first through sixth stakes are each composed of a material selected from the group consisting of metals, plastics and wood materials.

* * * * *